June 9, 1925.

M. C. SCHWEINERT

PUMP COUPLING

Original Filed Sept. 13, 1915

1,540,906

WITNESSES:

INVENTOR
Maximilian Charles Schweinert,
By Attorneys,

Patented June 9, 1925.

1,540,906

UNITED STATES PATENT OFFICE.

MAXIMILIAN CHARLES SCHWEINERT, OF NEW YORK, N. Y.

PUMP COUPLING.

Application filed September 13, 1915, Serial No. 50,294. Renewed November 13, 1924.

*To all whom it may concern:*

Be it known that I, MAXIMILIAN C. SCHWEINERT, a citizen of the United States of America, residing in the borough of Manhattan, city, county, and State of New York, have invented certain new and useful Improvements in Pump Couplings, of which the following is a specification.

This invention relates to pump couplings, and aims to provide certain improvements therein.

The invention is particularly directed to couplings for connecting the air tube of a pump, reservoir or the like to pneumatic tires. The specific object in view is to provide a single coupling which is capable of being connected to pneumatic tire valves of different sizes and types such for instance as those which constitute the standard types in the United States and England.

A comparison of such standard valves discloses that the valves in common use in England are provided with an exteriorly threaded pump coupling nipple which is of smaller size and coarser thread than the nipple of the standard American valve. By the present invention there is associated in one coupling means for connecting with each of these nipples, or other nipples which are sufficiently different to prevent the use of a coupling having a single thread. The invention includes other features of novelty which will be hereinafter more fully pointed out.

Referring to the drawings—

Figure 1:
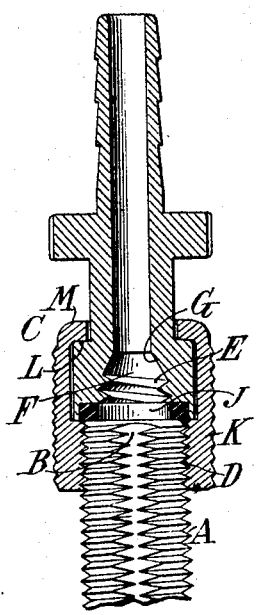
Figure 1 is a diametrical section of the coupling provided by my invention shown as applied to a valve of one type.
Figure 2:
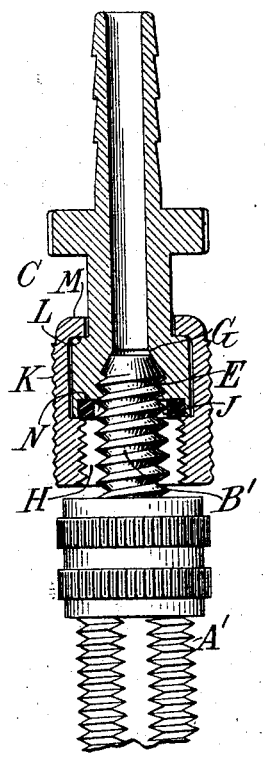
Fig. 2 is a similar section shown as applied to a valve of a different type.

Referring first to Figure 1, let A indicate a pneumatic tire valve, the upper part B of which constitutes the nipple adapted to receive a pump connection for inflation purposes. In the particular valve illustrated the tire valve casing is of substantially the same diameter throughout but in larger sizes, the nipple B retains the same diameter, the remainder of the casing being enlarged. Referring now to Fig. 2, let A′ indicate another type of valve in which the nipple B′ is of smaller diameter than the nipple B. According to the present invention I provide a single coupling C which has means for connection with the nipple B or the nipple B′ at will. In the particular construction shown the means for connection with the nipple B comprises a thread D, and the means for connection with the nipple B′ comprises a thread E. By this means a single pump coupling may be utilized for several types of valve.

In the construction shown in Figs. 1 and 2 the valve A is of the standard American type, and the valve A′ of the well known British type. With these particular types of valves the matter is complicated by the precise sizes and constructions of the nipples B and B′. The nipple B is not only of larger external diameter than the nipple B′, but its threads are finer than those of the nipple B′. The difference in diameters is such that a coupling screwing on the exterior of the nipple B′ cannot be made small enough to screw into the interior of the nipple B, so that the interior threads with which the American valve is commonly provided cannot be availed of. On the other hand the diameter of the American valve is so large that a coupling screwing on the exterior thereof is much too large to catch the threads of the foreign valve. According to the present invention the coupling may be formed to engage one valve and provided with a supplemental part designed to screw into it and being formed with provisions for engaging the other valve. This would however introduce a detachable part which I prefer to avoid.

In the specific constructions of valves shown a packing washer is required to make a tight joint between the American valve and the coupling, while in the case of the foreign valve the tight joint is designed to be obtained by a tapered seat formed on the end of the valve nipple which coacts with a complemental seat formed on the interior of the coupling.

The specific construction which I prefer to use in the particular case involved is that illustrated in Figs. 1 and 2. In this construction the coupling C is formed on its interior with a bore F, the inner end of the bore being constructed with the tapered seat G, and the bore being threaded with a coarse thread to engage the nipple B′. Beyond the bore F the coupling is provided with an enlarged bore H which is also screw-threaded (and with a finer thread) which is adapted to engage the nipple B. A packing J is located just within the bore H and serves to make a tight joint between the end of the nipple B and the body of the coupling C. As thus constructed a leak-tight joint can be made in both types of valves. The features thus far described are illustrated in Fig. 5. I prefer however to construct the device in two parts, the body of the coupling containing the bore F and the bore H being formed in a part K (Figs. 1 and 2) connected to the body of the coupling. In uniting the parts the inner end of the part K is turned over a shoulder L formed on the body of the coupling to make a flange M. By this construction packing J can be more easily introduced and held more securely in position since the part K overlaps the packing which is inserted before the parts are connected.

Preferably also the part K is swivelled to the body of the coupling so as to be capable of easily turning thereon, this permitting the connection of the coupling to the valve A without rotating the pump or its air tube. This construction is also advantageous in that the packing J does not rotate after it strikes the end of the valve nipple B, and hence is not subject to distortion in screwing or unscrewing the coupling. In order to further protect the packing a recess N is formed in the lower face of the coupling body and the packing is carried in this recess.

Figure 3:
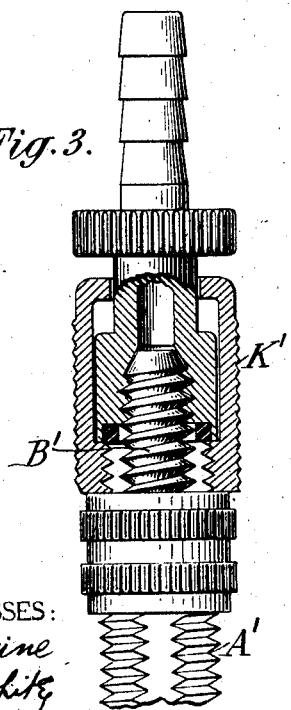
Fig. 3 is a similar section, partly in elevation, showing a modification.

In the construction shown in Fig. 3 the member K' is capable of some considerable telescopic movement, so that when the device is applied to the valve A the threaded bore H takes a position which is further on the valve. At the same time when the coupling is used on the valve A' the member K occupies no more space beneath the body of the coupling than in Figs. 1 and 2.

Figure 4:
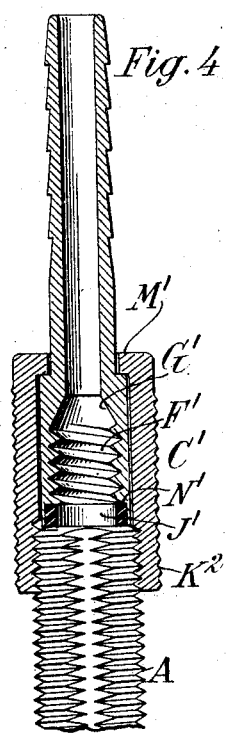
Fig. 4 is a diametrical section of another modification.

In the construction shown in Fig. 4 the coupling C' has its body portion formed with the small bore F' and tapered seat G' as before. The exterior diameter of its lower end is however smaller than that shown in Figs. 1 to 3 so that there is not as much space at the end of the member for the packing recess N' with a consequence that the packing J' must be made smaller. The member K² in this construction is preferably a straight sleeve with its inner end flanged at M' to fit over the shoulder L' of the body portion. By this construction the member K² is capable of telescoping along the body portion, so that when not in use it assumes any position which is necessitated by the construction of the valve A'. When in use it extends beyond the body portion as illustrated. The construction of Fig. 4 permits the bores F' and H' to be as long as desired, and consequently the number of threads in each bore may be increased.

While I have shown and described several embodiments of the invention it will be understood that I do not wish to be limited thereto since various changes can be made therein without departing from the spirit of the invention.

What I claim is:—

1. A pump coupling having a body portion formed with a threaded bore and a member below said body portion swivelled thereto and formed with a second threaded bore of larger diameter than the first, and a packing washer carried at the end of said body portion and partly overlapped by said member.

2. A pump coupling having a body portion formed with a tapered seat, a screw-threaded bore leading to said seat, a member swivelled to said body portion and having a screw-threaded bore of larger diameter than the first and in line therewith, and a packing between said member and said body portion.

3. A pump coupling having a body portion formed with a tapered seat, a screw-threaded bore leading to said seat, a member swivelled to said body portion and having a screw-threaded bore of larger diameter than the first and in line therewith, and a packing carried by said body portion and lying between the same and said member.

In witness whereof, I have hereunto signed my name in the presence of two subscribing witnesses.

MAXIMILIAN CHARLES SCHWEINERT.

Witnesses:
E. V. MYERS,
FRED WHITE.